United States Patent [19]

Peaster

[11] 4,436,326

[45] Mar. 13, 1984

[54] FLEXIBLE COUPLING FOR FLUID DUCTS

[75] Inventor: Bertram A. Peaster, Marietta, Ga.

[73] Assignee: Lockheed Corporation, Burbank, Calif.

[21] Appl. No.: 282,760

[22] Filed: Jul. 13, 1981

[51] Int. Cl.³ .............................................. F16L 55/00
[52] U.S. Cl. ..................................... 285/178; 285/184; 285/233
[58] Field of Search ......................... 285/233, 184, 178

[56] References Cited

U.S. PATENT DOCUMENTS

| | | | |
|---|---|---|---|
| 2,971,781 | 2/1961 | Torres | 285/233 |
| 3,405,957 | 10/1968 | Chakroff | 285/233 X |
| 3,669,472 | 6/1972 | Nadsady | 285/233 X |
| 3,704,034 | 11/1972 | Shire | 285/178 X |

FOREIGN PATENT DOCUMENTS 522224 3/1955 Italy ...................................... 285/184

*Primary Examiner*—Dave W. Arola
*Attorney, Agent, or Firm*—John J. Sullivan

[57] ABSTRACT

The object of the invention is to provide a coupling for fluid conveying ducts which has built in capability to allow for radial and/or angular misalignment of the ducts which it is coupling and also retain axial flexibility. Such coupling includes a pair of interconnectable coupling half assemblies each with eccentric openings (17) for passage of one of the tube ends (10) therethrough with their associated ends in spaced relation. These coupling half assemblies also may include abutting faces disposed in a plane (P) oblique to their longitudinal centerline (C). Relative adjustment of the eccentric openings (17) provides radial adjustment of the tubes (10) while relative adjustment of the coupling half assembly faces along the plane (P) provides angular adjustment of the tubes (10). Any combination of axial, radial, and/or angular misalignment of the tubes (10) within the dimensional envelope of the coupling can be accommodated by manipulation of the parts relative to each other.

7 Claims, 6 Drawing Figures

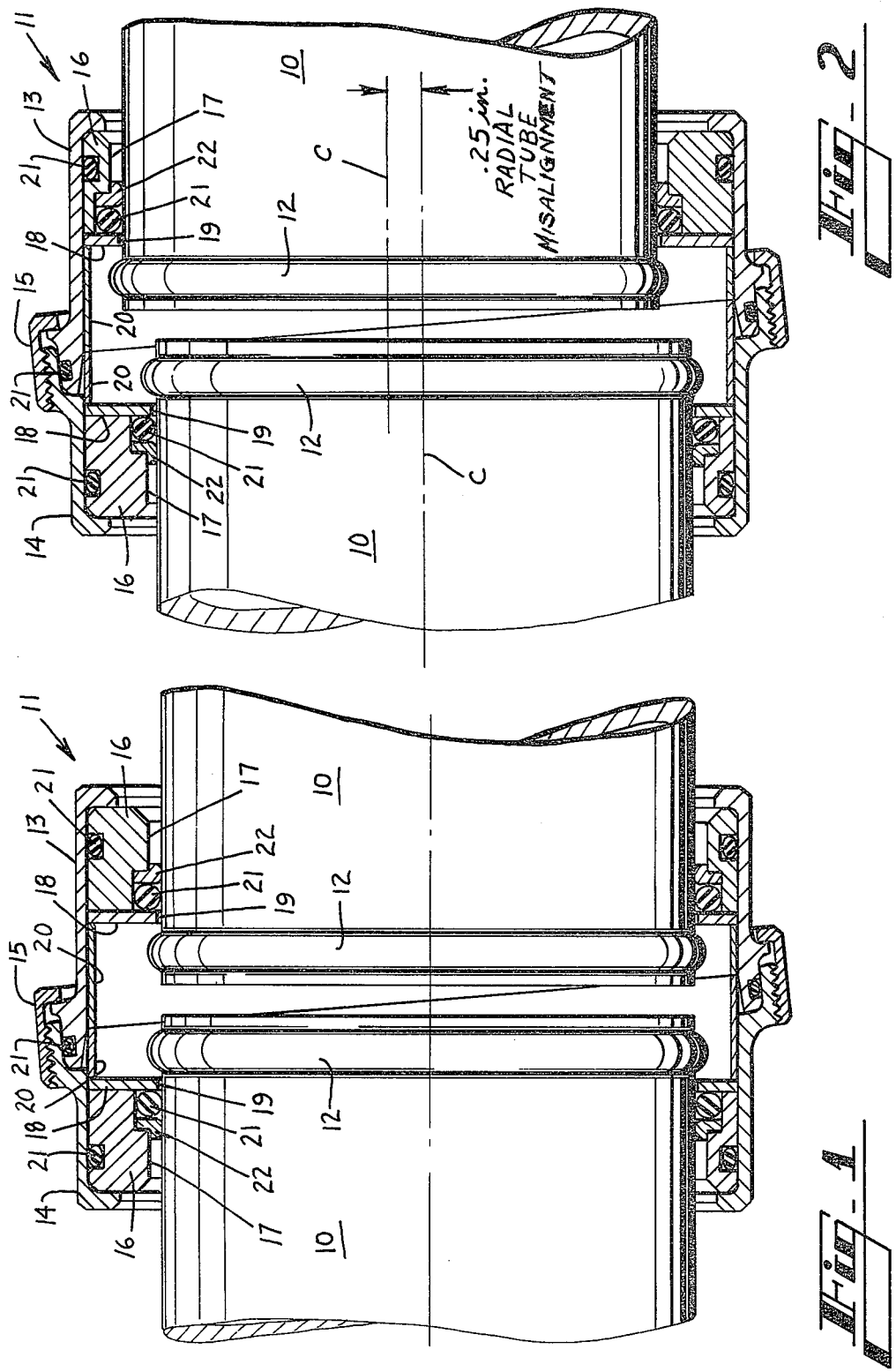

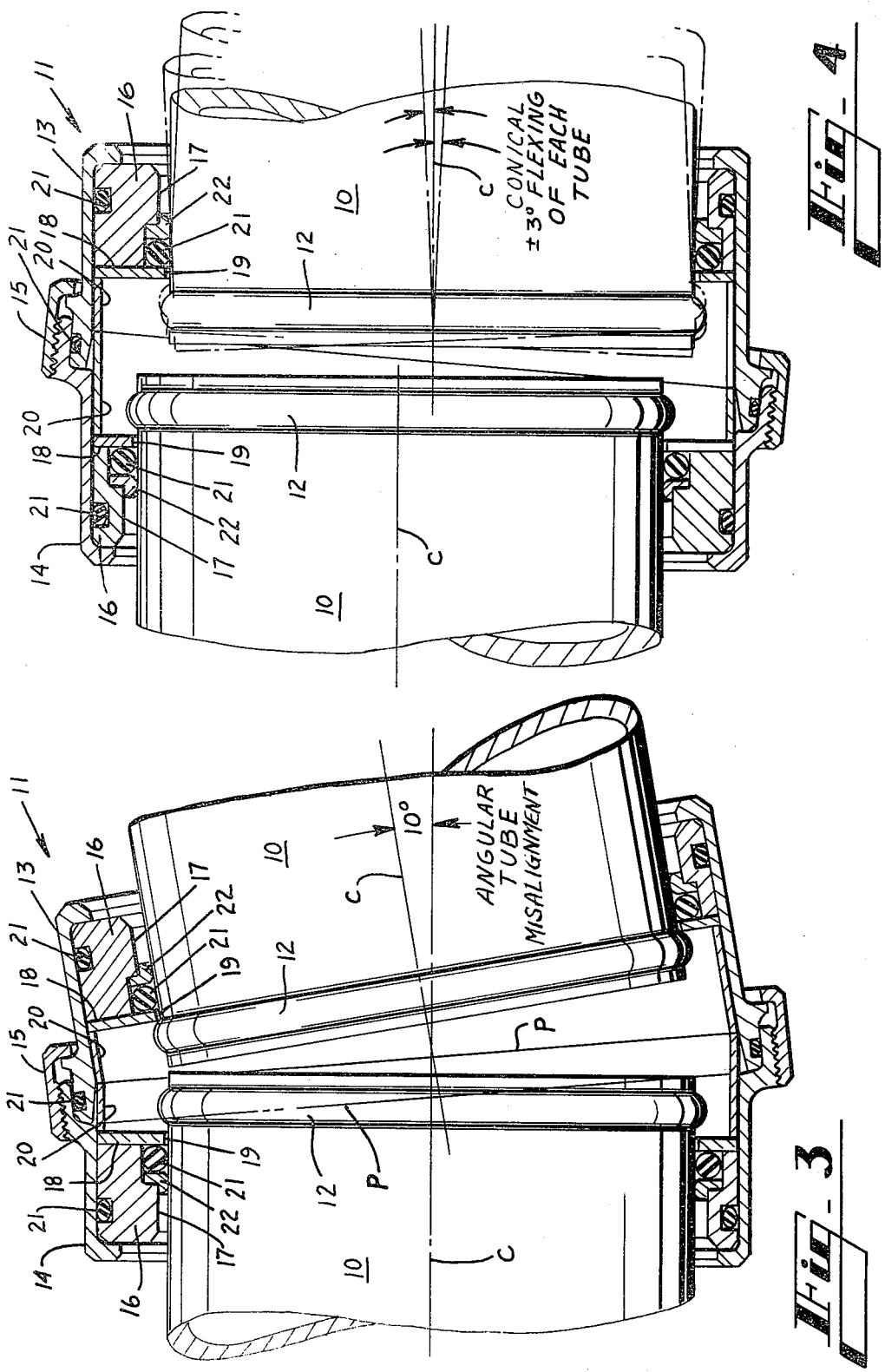

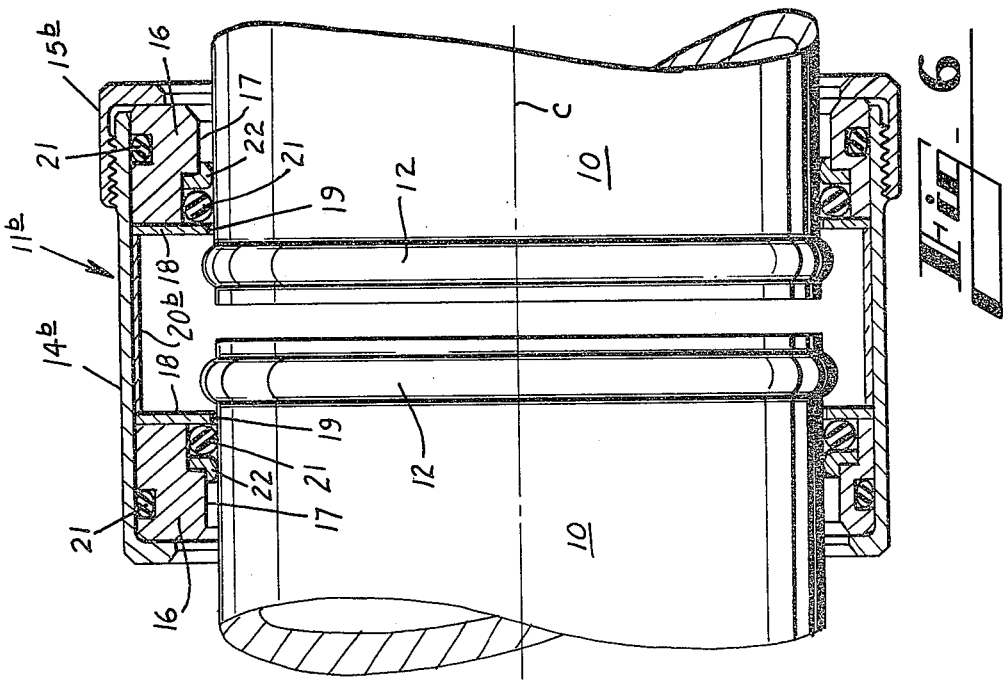
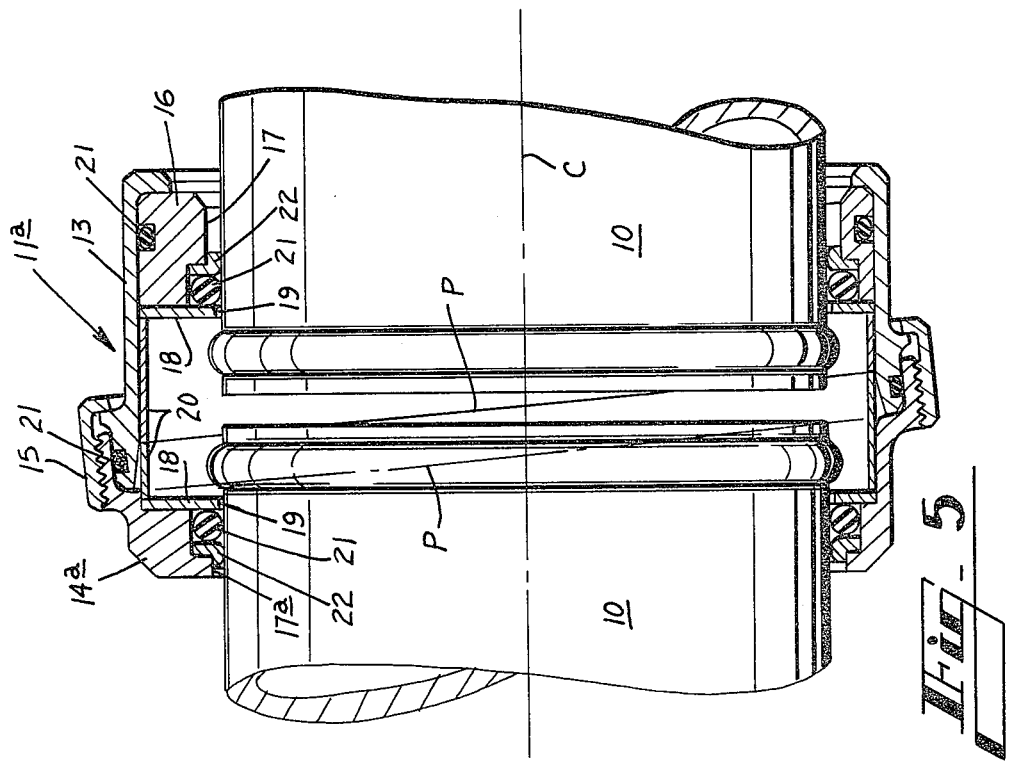

FLEXIBLE COUPLING FOR FLUID DUCTS

TECHNICAL FIELD

This invention relates generally to couplings for fluid ducts and more particularly to a coupling that is adjustable to accommodate misalignment of ducts to be connected in any one or any combination of the three basic directions, viz. axial, radial and angular and when connected permits conical flexibility to a substantial degree, i.e. on the order of ±3°.

So-called flexible couplings are used extensively in fuel and hydraulic lines or ducts where it is desirable that they are capable to allow for substantial misalignment of the ducts to facilitate their interconnection and installation. When couplings are not compatible with the fluid system requirements, internal stresses are built up in the ducts and couplings, and leakages and structural failures occur.

Also in many applications, for example in fluid systems of vehicles, notably aircraft, it is additionally important that these couplings permit flexibility or movement between the connected ducts when the vehicle or aircraft is in operation.

BACKGROUND ART

The prior art includes an assortment of couplings designed for a variety of applications in which they provide limited flexibility i.e. flexibility in one of the essential directions primarily to facilitate installation of the ducts, pipes or connected members. There is presently no known coupling available which is capable of adjustments which permit proper assembly of ducts which are both radially and angularly misaligned. Known couplings are represented by the following patents:

U.S. Pat. No. 1,304,980—May 27, 1919—Hirshstein
U.S. Pat. No. 1,793,681—Feb. 24, 1931—Crowell
U.S. Pat. No. 2,295,416—Sept. 8, 1942—Madison
U.S. Pat. No. 2,342,120—Feb. 22, 1944—Cartwright
U.S. Pat. No. 2,390,501—Dec. 11, 1945—Abrams
U.S. Pat. No. 2,489,100—Nov. 22, 1949—Marco
U.S. Pat. No. 2,557,507—June 19, 1951—Lang
U.S. Pat. No. 2,581,047—Jan. 1, 1952—Salmond et al
U.S. Pat. No. 2,886,262—May 12, 1959—Fletcher
U.S. Pat. No. 3,704,034—Nov. 28, 1972—Shire et al
U.S. Pat. No. 3,899,200—Aug. 12, 1975—Gamble
German No. 805,637—May 25, 1951—Holtery

DISCLOSURE OF INVENTION

In accordance with the present invention, a coupling is provided which has inherent or built-in capability to allow either one or both radial and angular misalignment of the ducts or tubes which it connects while at the same time retaining axial movement. Moreover, both modes of duct misalignment are independent of each other with virtually no limit to the degree of tolerance to misalignment which can be achieved without any external applied torque or force, or distortion or distress of the sealing members.

In the broadest terms the flexible coupling herein proposed comprises a pair of coupling half assemblies, one adapted to overlie and surround each of a pair of duct ends to be connected thereby. Each of the coupling half assemblies includes an eccentric opening for the passage therethrough of the associated duct and an engagement for coaction with the engagement of the other assembly whereby the coupling half assemblies are secured one to the other against relative movement. A pair of similar discs is associated with the coupling half assemblies, each being provided with a central eccentric opening substantially equal to the external dimension of said duct ends for the passage therethrough of one of said duct ends and abutment against the face of the associated coupling half assembly defining said central eccentric opening. These discs when so positioned are retained in position by a ring spacer having an overall diameter substantially equal to the internal diameter of the coupling half assemblies and adapted to abut the adjacent faces of the discs.

Preferably the coupling half assemblies are in the form of a pair of cup-like elements having their adjacent open ends disposed in an oblique plane relative to their longitudinal centerline for abutment one with the other at all times during their angular adjustment. The central eccentric openings of the coupling half assemblies are contained within two identical inserts. The relative radial adjustment of the inserts accommodates the radial duct or tube misalignment, the inserts being rotated inside the coupling half assemblies. Relative rotation of the coupling half assemblies accommodates the angular misalignment of the ducts or tubes. Axial misalignment of the ducts or tubes is a feature of the coupling detail dimensions and can vary to suit any particular installation.

It is noted that a simpler form of coupling in accordance with the present invention can be made wherein only one eccentric insert is used. Further a coupling can be made with either one or two eccentric inserts wherein the coupling halves are made with the abutment faces at right angles to the ducts, thereby simplifying the design. However, these designs would not meet the total requirements stated above and are, therefore, considered to be less desirable.

BRIEF DESCRIPTION OF DRAWINGS

The details of the present invention will be described in connection with the accompanying drawings, in which FIG. 1 is a section through a flexible coupling constructed in accordance with the teachings herein and shown in engagement with the end portions of two aligned ducts secured thereby but capable of relative axial movement;

FIG. 2 is a similar view showing the position of the coupling elements to accommodate the radial misalignment of the secured ducts;

FIG. 3 is a similar view showing the position of the coupling elements to accommodate the angular misalignment of the secured ducts;

FIG. 4 is a similar view depicting the conical flexing of which each duct is capable when connected by the coupling in addition to the three modes of misalignment;

FIG. 5 is a similar view of a modified form of coupling; and

FIG. 6 is a similar view of another modified form of coupling.

BEST MODE FOR CARRYING OUT THE INVENTION

Referring more particularly to FIGS. 1 through 4 of the drawings 10 designates a pair of adjacent duct or tube ends to be interconnected by a flexible coupling 11. Each tube end 10 terminates in a lateral projection which may be for example a bead 12 formed or otherwise provided on the end of the duct 10 so as to be in effect an integral part thereof.

The coupling 11 comprises a pair of cup-like halves or elements 13 and 14 adapted to abut and overlap at their adjacent ends where they are secured one to the other in any conventional manner, such as for example by means of and through peripheral threads and a ring nut 15. Within each coupling half element 13 and 14 is a circular insert 16 having an overall diameter substantially equal to the internal diameter of the coupling half element 13 and 14. The inserts are identical one to the other, each being provided with an eccentric passage 17 sized to accommodate the associated tube end 10 and bead 12. A disc 18 corresponding in overall diameter to the internal diameter of the coupling half elements 13 and 14 and having an eccentric passage 19 similar to the passages 17 but sized to the outside diameter of the tubes 10 is disposed on each tube 10 between the insert 16 and the bead 12. These discs or split rings 18 as more accurately termed are held in position by a two-piece ring spacer 20 having an outside diameter approximately equal to the internal diameter of the coupling half elements 13 and 14.

The adjacent end faces of the coupling half elements 13 and 14 and the abutting edges of the two-piece spacer 20 are located in an oblique plane "P" relative to the longitudinal centerline "C". Relative rotation of the inserts 16 and their split rings 18 provides the radial adjustment of the coupling 11 to the tubes 10 while relative rotation of the coupling half elements 13 and 14 and spacer halves 20 provides the angular adjustment of the coupling 11 to the tubes 10.

Following conventional practice seals 21 are provided between all relatively movable surfaces of the coupling half elements 13 and 14, and the inserts 16 and their respective coupling half elements 13 and 14 and tube ends 10. In addition a back-up ring 22 is employed with each of the seals 21 associated with each insert 16 adjacent the tubes 10. These back-up rings 22 are identical one to the other each being preferably angular in section so as to extend into each insert passage 17 and be disposed between the ducts 10 and the adjacent surfaces of the inserts 16. The inner surface of each ring 22 in contact with the adjacent tube 10 is curved to provide the seating for each tube 10 when conical movement is present (FIG. 4).

In the modified form of coupling shown in FIG. 5 and designated 11$^a$ only one insert 16 is employed. In lieu of the second insert 16 a modified coupling half element 14$^a$ is provided which includes a passage 17$^a$ sized to accommodate the associated tube end 10 and projection or bead 12. Although not mandatory, the passage 17$^a$ is preferably eccentric as in the insert 16 to allow all adjustments for misalignment as in the coupling 11 of FIGS. 1 through 4. As indicated all of the other parts of the coupling 11$^a$ of FIG. 5 are the same as those in FIGS. 1 through 4.

FIG. 6 shows another form of coupling indicated at 11$^b$ wherein no allowance has been made for angular misalignment of the tubes 10. Otherwise this coupling 11$^b$ has the same capability as couplings 11 and 11$^a$. In this case identical circular inserts 16 are employed as in FIGS. 1 through 4. A coupling half element 14$^b$ is provided to coact with a modified ring nut 15$^b$ to secure the assembly and a single ring spacer 20$^b$ is used to retain the split rings 18.

ASSEMBLY AND OPERATION OF THE PREFERRED EMBODIMENT

The tube ends 10 are brought toward each other with their respective coupling half elements 13 and 14 (13 and 14$^a$ or 14$^b$ and 15$^b$) and inserts 16 in place. The seals or o-rings 21 and the back-up rings 22 are inserted in their respective grooves provided therefor in the peripheries of the inserts 16 (14$^a$) and coupling half element 13. The split rings 18 are then placed in abutment against the opposite faces of the inserts 16 (14$^a$), this being accomplished by opening or spreading the split rings 18 to permit them to pass around the projections or beads 12 and onto the tube ends 10. The spacer 20 (20$^b$) is then positioned between the rings 18 and the coupling half elements 13 and 14 (13 and 14$^a$ or 14$^b$ and 15$^b$) are brought into abutment and secured by tightening the ring nut 15 (15$^b$). If the tube ends 10 axially align one with the other within, for example 0.38 inches (9.67 millimeters) relative axial movement, as shown in FIG. 1, abutment of the coupling half elements 13 and 14 (13 and 14$^a$ or 14$^b$ and 15$^b$) is automatic whereby the ring nut 15 (15$^b$) may be passed over the assembly and tightened on the threaded surfaces of the outer coupling element half 14 (14$^a$) or 14$^b$) to complete the installation. If however, the tube ends 10 are axially misaligned in relation to each other, for example by 0.25 inches (6.35 millimeters) as shown in FIG. 2 the coupling half elements 13 and 14 (13 and 14$^a$ and 15$^b$) will not abut. In this case the inserts 16 (14$^a$) and their split rings 18 are rotated until such abutment occurs and the ring nut 15 (15$^b$) is threaded up tight completing the installation.

If, when brought together the tube ends 10 are angularly misaligned relative to each other, for example by 10° (FIG. 3) the coupling half elements 13 and 14 (13 and 14$^a$) will not abut. In this case the coupling half elements 13 and 14 (13 and 14$^a$) and the spacers 20 are rotated until such abutment occurs and the ring nut 15 is threaded up tight completing the installation.

It is to be noted that all seals 21 are normally compressed by diametrical location in their respective members, and are not in any way distressed by the assembly action of the nut 15 (15$^b$) on the coupling 11 (11$^a$ or 11$^b$).

When the installation is completed whether or not upon axial alignment of the tube ends 10 or upon adjustment to correct for radial and/or angular misalignment, as described, the tube ends 10 are capable of limited relative axial movement. The degree of such movement is a function of physical dimensions of the coupling elements and the spacing between the tube ends 10. Further the tube ends 10 may oscillate within the coupling 11 (11$^a$ or 11$^b$) through an angle of for example about ±3° (conically) without any undue stresses or loads being conducted to the mechanical parts. The extent of the radial misalignment (0.25 in. shown) and the angular misalignment (10° shown) are also both functions of the physical dimensions of the coupling elements, and are therefore unlimited.

I claim:

1. A flexible coupling for fluid ducts when disposed end to end comprising:
   a pair of coupling half assemblies, one adapted to overlie and surround each of said duct ends, at least one of said assemblies including an insert having an eccentric opening for the passage therethrough of the associated duct end and each of said assemblies having an engagement complemental to the engagement of the other assembly;

a connector operative on said engagements to thereby secure them one to the other against relative movement;

a ring spacer having an overall diameter substantially equal to the internal diameter of said coupling half assemblies;

a pair of discs, each provided with a central eccentric opening substantially equal in diameter to the external dimension of each respective one of said duct ends for the passage therethrough of said one duct end, one of said discs being disposed between each said coupling half assembly and said ring spacer; and a seal between each coupling half assembly and the associated disc.

2. The coupling of claim 1 including a back-up ring between each coupling half assembly and the associated disc.

3. The coupling of claim 1 wherein one insert is included in each said coupling half assembly.

4. The coupling of claim 1 wherein each fluid duct end includes a lateral projection and each said disc is a split ring.

5. The coupling of claim 1 wherein the adjacent ends of said coupling half assemblies, are disposed at an angle so as to be in an oblique plane relative to the longitudinal centerline for abutment one with the other at all times during their angular adjustment and said ring spacer is formed in two pieces with faces in abutment at the same angle as the adjacent coupling half assemblies aforesaid.

6. The coupling of claim 5 wherein said complemental coupling half assembly engagements are coacting threads on the peripheral surfaces of said coupling half assemblies.

7. The coupling of claim 6 wherein the threads on the peripheral surface of one of said coupling half assemblies are carried by a ring retainer associated therewith.

* * * * *